(12) United States Patent
Menge (10) Patent No.: US 9,395,451 B2
(45) Date of Patent: Jul. 19, 2016

(54) APPARATUS INCLUDING A LIGHT EMITTING DEVICE, A LAYER HAVING A POSITIVE REFRACTIVE INDEX, AND A LAYER HAVING A NEGATIVE REFRACTIVE INDEX

(71) Applicant: Peter R. Menge, Novelty, OH (US)

(72) Inventor: Peter R. Menge, Novelty, OH (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 82 days.

(21) Appl. No.: 14/028,083

(22) Filed: Sep. 16, 2013

(65) Prior Publication Data

US 2014/0091224 A1    Apr. 3, 2014

Related U.S. Application Data (60) Provisional application No. 61/707,913, filed on Sep. 29, 2012.

(51) Int. Cl.
*G01T 1/20* (2006.01)

(52) U.S. Cl.
CPC .............. *G01T 1/2002* (2013.01); *G01T 1/2018* (2013.01); *G01T 1/2006* (2013.01)

(58) Field of Classification Search
USPC ......................................................... 250/366
See application file for complete search history.

(56) References Cited

U.S. PATENT DOCUMENTS

| | | | |
|---|---|---|---|
| 4,029,964 A * | 6/1977 | Ashe ............................. | 250/368 |
| 6,788,273 B1 | 9/2004 | Schultz et al. | |
| 7,508,474 B2 | 3/2009 | Kashima | |
| 8,399,841 B2 * | 3/2013 | Hansen et al. ................ | 250/366 |
| 2004/0169616 A1 * | 9/2004 | Schultz et al. ................ | 343/872 |
| 2006/0072196 A1 | 4/2006 | Hyde et al. | |
| 2008/0212921 A1 * | 9/2008 | Gaylord et al. ................. | 385/14 |
| 2009/0045348 A1 | 2/2009 | Stuenkel et al. | |
| 2009/0261259 A1 * | 10/2009 | Yip .......................... | 250/370.09 |
| 2009/0273538 A1 | 11/2009 | Smith et al. | |
| 2010/0155616 A1 | 6/2010 | Friedman | |
| 2011/0291014 A1 | 12/2011 | Kusner | |
| 2012/0001075 A1 * | 1/2012 | Frach et al. .................... | 250/362 |
| 2012/0057238 A1 * | 3/2012 | Byren et al. ................... | 359/588 |
| 2013/0009066 A1 * | 1/2013 | Grazioso et al. ......... | 250/363.03 |

FOREIGN PATENT DOCUMENTS

WO    2006133438 A2    12/2006

OTHER PUBLICATIONS

International Search Report for PCT/US2013/059973 dated Dec. 11, 2013, 4 pgs.

Xiao, Shumin, et al. "Yellow-light Negative-index Metamaterials", Optics Letters, vol. 34, No. 22, Nov. 15, 2009, 11 pages.

(Continued)

*Primary Examiner* — Christine Sung
(74) *Attorney, Agent, or Firm* — Abel Law Group, LLP (57) ABSTRACT

An apparatus can include a light emitting device and a light sensing device optically coupled to the light emitting device via a first layer and a second layer. In an embodiment, the first layer can have a first thickness and a first index of refraction with a value greater than 0 and the second layer can have a second thickness and a second index of refraction with a value less than 0. In a particular embodiment, the light emitting device can include a scintillator and the light sensing device can include a photosensor.

20 Claims, 5 Drawing Sheets

(56) References Cited

OTHER PUBLICATIONS

Soukoulis, Costas M., et al. "Negative Refractive Index at Optical Wavelengths", Science, vol. 315, Jan. 5, 2007, p. 47-49.
Veselago, Victor, et al. "Negative Refractive Index Materials", J. Comput. Theor. Nanosci, vol. 3, No. 2, 2006, p. 1-30.
Shalaev, Vladimir M., "Optical Negative-index Metamaterials", Nature Photonics, vol. 1, Jan. 2007, p. 41-48.
Jen, Yi-Jun, et al "Deposited metamaterial thin film with negative refractive index and permeability in the visible regime", Optics Letters, vol. 36, Issue 6, 2011, p. 1014-1016. Abstract Only.

* cited by examiner

APPARATUS INCLUDING A LIGHT EMITTING DEVICE, A LAYER HAVING A POSITIVE REFRACTIVE INDEX, AND A LAYER HAVING A NEGATIVE REFRACTIVE INDEX

CROSS-REFERENCE TO RELATED APPLICATION

This application claims priority under 35 U.S.C. §119(e) to U.S. Patent Application No. 61/707,913 entitled "Apparatus Including A Light Emitting Device, A Layer Having A Positive Refractive Index, And A Layer Having A Negative Refractive Index," by Menge, filed Sep. 29, 2012, which is assigned to the current assignee hereof and incorporated herein by reference in its entirety.

FIELD OF THE DISCLOSURE

The present disclosure is directed to an apparatus including a light emitting device optically coupled to a layer having a positive refractive index and a layer having a negative refractive index.

BACKGROUND

Scintillator-based radiation detectors are used in a variety of applications, including research in nuclear physics, oil exploration, field spectroscopy, container and baggage scanning, and medical diagnostics. When a scintillator of the scintillator-based detector is exposed to particle radiation, the scintillator absorbs energy of incoming particles and scintillates, emitting the absorbed energy in the form of photons. The photons can be detected and converted to electrical pulses that can be processed by electronic devices and registered as counts that are transmitted to analyzing equipment. In some cases, an array of scintillator pixels is arranged, such that each particular scintillator pixel is associated with a respective photosensor. Cross-talk can occur when photons emitted from a particular scintillator are detected by a photosensor that is not associated with the particular scintillator. In radiation detection apparatuses used to produce images, cross-talk can degrade the quality of the images. Further improvements of scintillator-based radiation detection devices are desired.

BRIEF DESCRIPTION OF THE DRAWINGS

Embodiments are illustrated by way of example and are not limited in the accompanying figures.

The use of the same reference symbols in different drawings indicates similar or identical items.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention. The use of the same reference symbols in different drawings indicates similar or identical items.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or other features that are inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

In addition, as used herein, the term "positive refractive index" refers to an index of refraction with a value greater than 0, and the term "negative refractive index" refers to index of refraction with a value less than 0.

The use of "a" or "an" is employed to describe elements and components described herein. This is done merely for convenience and to give a general sense of the scope of the embodiments of the disclosure. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this disclosure belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 1:
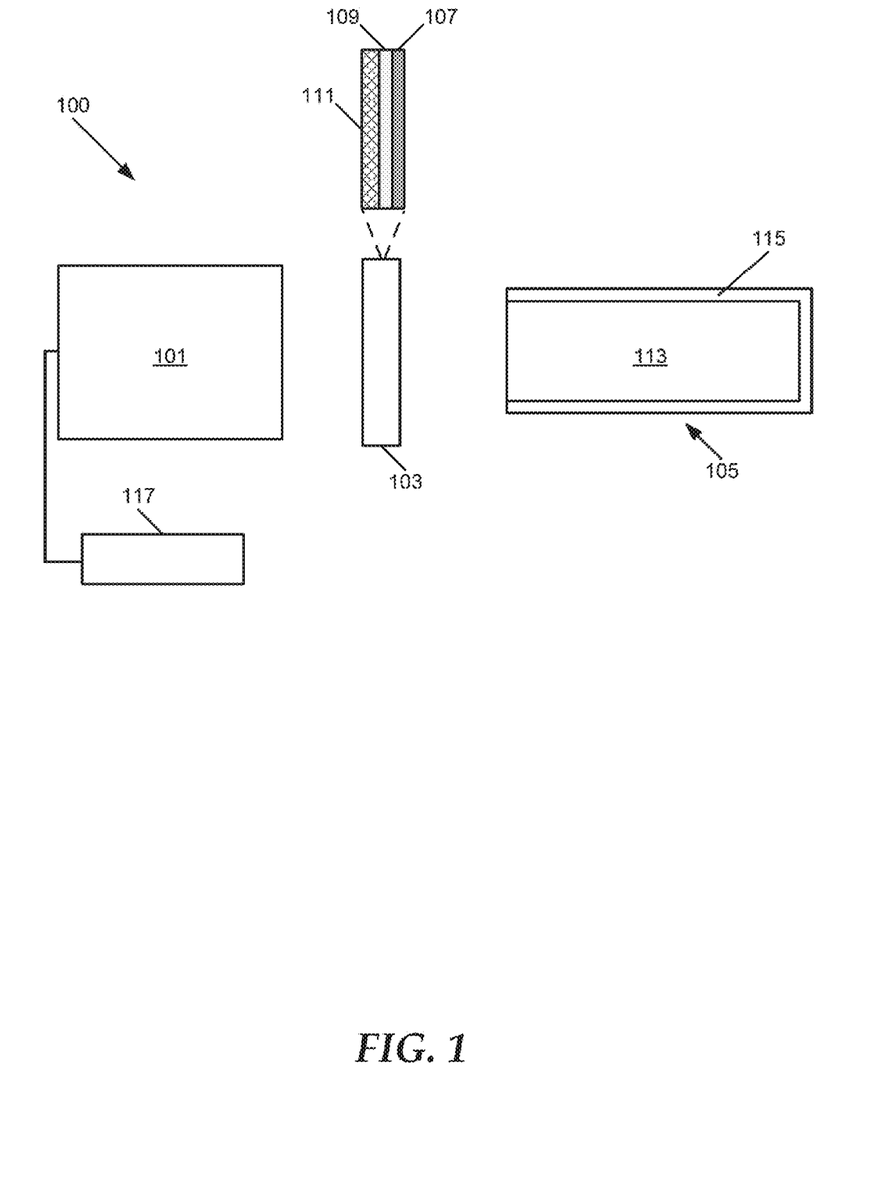
FIG. 1 is a diagram illustrating a particular embodiment of a radiation detection apparatus.

FIG. 1 is a diagram illustrating a particular embodiment of a radiation detection apparatus 100. The radiation detection apparatus 100 can include an imaging apparatus, a well logging apparatus, a security inspection apparatus, or another suitable apparatus for detecting radiation. In an embodiment, the radiation detection apparatus 100 can include or be a component of a Computed Tomography ("CT") apparatus, a Single Positron Emission Computer Tomography ("SPECT") apparatus, a Positron Emission Tomography ("PET") apparatus, or an X-ray apparatus. The radiation detection apparatus 100 can also include a photosensor 101, an optical interface 103, and a scintillation device 105. Although the photosensor 101, the optical interface 103, and the scintillation device 105 are illustrated separate from each other, the photosensor 101 and the scintillation device 105 can each be adapted to be coupled to the optical interface 103, with the optical interface 103 disposed between the photosensor 101 and the scintillation device 105.

The photosensor 101 can be a photodiode, a photomultiplier tube ("PMT"), a silicon photomultiplier tube ("SiPM"), an avalanche photodiode ("APD"), a hybrid PMT, or any combination thereof. In an embodiment, the photosensor 101 can be configured to detect particular scintillating light emitted by the scintillation device 105 or light derived from such scintillating light, such as wavelength shifted light. Furthermore, although one photosensor 101 is illustrated in FIG. 1, the radiation detection apparatus 100 can include a number of photosensors, such as an array of photosensors.

The optical interface 103 can comprise a first layer 107 and a second layer 109 disposed between the photosensor 101 and the scintillation device 105. In an embodiment, the first layer 107, the second layer 109, or both can have an index of refraction that is different from the index of refraction of the scintillation device 105. In a particular embodiment, the first layer 107, the second layer 109, or both can have an index of refraction with a value that is less than the value of the index of refraction of the scintillation device 105. In an illustrative embodiment, the first layer 107 can have an index of refraction with a value greater than 0 and the second layer 109 can have an index of refraction with a value less than 0. In another embodiment, the first layer 107 can have an index of refraction with a value that is less than 0 and the second layer 109 can have an index of refraction with a value that is greater than 0.

Additionally, the first layer 107 can have a first thickness, and the second layer 109 can have a second thickness. In a particular embodiment, an absolute value of a product of the thickness of the first layer 107 and the index of refraction of the first layer 107 can be within at least approximately 35% of an absolute value of a product of the thickness of the second layer 109 and the index of refraction of the second layer 109. Although in one illustrative embodiment of FIG. 1 the optical interface 103 includes the first layer 107 with an index of refraction greater than 0 and the second layer 109 with an index of refraction less than 0, in another embodiment, the optical interface 103 can include a plurality of layers having an index of refraction with a value that is greater than 0, a plurality of layers having an index of refraction with a value that is less than 0, or a combination thereof.

The optical interface 103 can also include a window 111 that can be optically coupled to the photosensor 101 and the scintillation device 105. In the illustrative embodiment of FIG. 1, the window 111 is disposed between the first layer 107 and the second layer 109 and the photosensor 101. In a particular embodiment, the window 111 can include quartz or sapphire. In some embodiments, the optical interface 103 may not include the window 111.

The scintillation device 105 can include a scintillation member 113 and a reflector 115 disposed along one or more sides of the scintillation member 113. In the illustrative embodiment of FIG. 1, the scintillation member 113 is substantially surrounded by the reflector 115. In a particular embodiment, the reflector 115 can include a metal foil, polytetrafluoroethylene (PTFE) or another suitable material capable of reflecting light emitted by the scintillation member 113. The reflector 115 can reflect photons back into the scintillation member 113 to be transmitted to the photosensor 101 via the side of the scintillation device 105 adjacent to the optical interface 103. Although the illustrative embodiment of FIG. 1 illustrates a single scintillation member, the radiation detection apparatus 100 can include multiple scintillation members.

In an embodiment, the radiation detection apparatus 100 can include more components or fewer components than those shown in FIG. 1. For example, the scintillation device 105 can include one or more shock absorbing members, one or more stabilization mechanisms (e.g. one or more springs), a housing, or any combination thereof. The radiation detection apparatus 100 can also include a wavelength shifter to shift a wavelength of scintillating light emitted from the scintillation member 113 to a derivative light that has a longer wavelength as compared to the scintillating light. In addition, the radiation detection apparatus 100 can comprise an optical filter material disposed between the scintillation device 105 and the photosensor 101. The optical filter material can filter out certain wavelengths of scintillating light, such that only particular wavelengths of scintillating light are provided to the photosensor 101.

The scintillation member 113 can include a scintillator and one or more additional materials. In an embodiment, the scintillator can be a polycrystalline material, a ceramic material, an organic material, or a combination thereof. In an illustrative embodiment, the scintillator can include a CsI(Tl) scintillator, a $Gd_2O_2S$(Tb) scintillator, a $Bi_4Ge_3O_{12}$ scintillator, a $CdWO_4$ scintillator, a $Gd_3Ga_5O_{12}$(Cr, Ce) scintillator, a $Lu_2O_3$(Eu) scintillator, a $(Gd,Y)_3(Ga,Al)_5O_{12}$(Ce) scintillator, a NaI(Tl) scintillator, a $LaBr_3$(Ce) scintillator, a $SrI_2$(Eu) scintillator, a $Lu_{1.8}Y_{0.2}SiO_5$(Ce) scintillator, or a combination thereof. In one aspect, the scintillator can be included in the radiation detection apparatus 100 by matching an efficiency of the photosensor 101 in sensing particular wavelengths of light with the spectrum of wavelengths of light emitted by the scintillator. For example, the photosensor 101 can have an increased efficiency when detecting light having wavelengths within a range of approximately 400 nm to approximately 475 nm and the scintillation member 113 can emit light having wavelengths that at least partially overlap with this range. In one particular illustration, the photosensor 101 can include a silicon photosensor and the scintillator can include a $Bi_4Ge_3O_{12}$ scintillator, a $CdWO_4$ scintillator, a $Gd_3Ga_5O_{12}$(Cr, Ce) scintillator, a $Lu_2O_3$(Eu) scintillator, or a $(Gd,Y)_3(Ga,Al)_5O_{12}$(Ce) scintillator. In another particular illustration, the photosensor 101 can include a photomultiplier tube and the scintillator can include a NaI(Tl) scintillator, a $LaBr_3$(Ce) scintillator, a $SrI_2$(Eu) scintillator, or a $Lu_{1.8}Y_{0.2}SiO_5$(Ce) scintillator.

The photosensor 101 can receive photons of scintillating light emitted by the scintillation member 113. In an embodiment, the scintillation member 113 can produce photons when exposed to certain forms of radiation, such as X-rays, gamma rays, neutrons, or a combination thereof. In a particular embodiment, the scintillation member 113 can emit scintillating light having a spectrum of wavelengths. For example, the spectrum of wavelengths of scintillating light emitted by the scintillation member 113 can include wavelengths of at least approximately 375 nm, at least approximately 402 nm, at least approximately 467 nm, or at least approximately 504 nm. In another example, the spectrum of wavelengths of scintillating light emitted by the scintillation member 113 may include wavelengths of no greater than approximately 755 nm, no greater than approximately 698 nm, no greater than approximately 627 nm, or no greater than approximately 551 nm. In an illustrative embodiment, the scintillating light can have an emission maximum within a range of approximately 504 nm to approximately 627 nm.

In one embodiment, the wavelengths of scintillating light, or a derivation thereof, emitted by the scintillation member 113 can be matched to the wavelengths of light that are efficiently sensed by the photosensor 101. For example, when the photosensor 101 senses blue light more efficiently than other colors of light, the scintillation member 113 can emit scintillating light within a range of approximately 450 nm to approximately 500 nm. In another example, when the photosensor 101 senses green light more efficiently than other colors of light, the scintillation member 113 can emit scintillating light within a range of approximately 505 nm to approximately 560 nm. In a further example, when the photosensor 101 senses yellow light more efficiently than other colors of light, the scintillation member 113 can emit scintillating light within a range of approximately 565 nm to approximately 585 nm. In an embodiment, the scintillating light emitted by the scintillation member 113 can be matched to the wavelengths of light that are efficiently sensed by the photosensor 101 by coupling a wavelength shifter to the scintillation member 113. In other embodiments, the type of the photosensor 101 can be chosen such that the wavelengths of light that are efficiently sensed by the photosensor 101 match the wavelengths of light emitted by the scintillation member 113.

When the photosensor 101 receives photons from the scintillation device 105, the photosensor 101 can produce electrical pulses based on numbers of photons received from the scintillation device 105. The photosensor 101 may provide the electrical pulses to electronics 117 that are electrically coupled to the photosensor 101. Electrical pulses produced by the photosensor 101 in response to receiving scintillating light, or a derivative thereof, can be shaped, digitized, analyzed, or any combination thereof, by the electronics 117 to provide a count of the photons received at the photosensor 101, increment a radiation counter, identify a source of radiation, or to provide other information. The electronics 117 can include an amplifier, a pre-amplifier, a discriminator, an analog-to-digital signal converter, a photon counter, another electronic component, or any combination thereof to generate information associated with the sensing of photons by the photosensor 101. In an embodiment, the electronics 117 can utilize information obtained in relation to photons received by the photosensor 101 to generate an image. In an illustrative embodiment, the electronics 117 can include Anger logic to generate images when a number of photosensors of the radiation detection apparatus 100 is less than the number of scintillation members of the radiation detection apparatus 100.

In a particular embodiment, the electronics 117 can differentiate photons emitted in response to interactions with different types of radiation. In one example, the electronics 117 can differentiate photons emitted in response to interactions with gamma rays from photons emitted in response to interactions with neutrons. In an illustrative embodiment, the electronics 117 can utilize a pulse-shape discrimination method, an energy discrimination method, another suitable method, or a combination thereof, to differentiate signals associated with different types of radiation. The photosensor 101 can be housed within a tube or housing made of a material capable of protecting the photosensor 101, the electronics 117, or a combination thereof, such as a metal, a metal alloy, other material, or any combination thereof.

Figure 2:
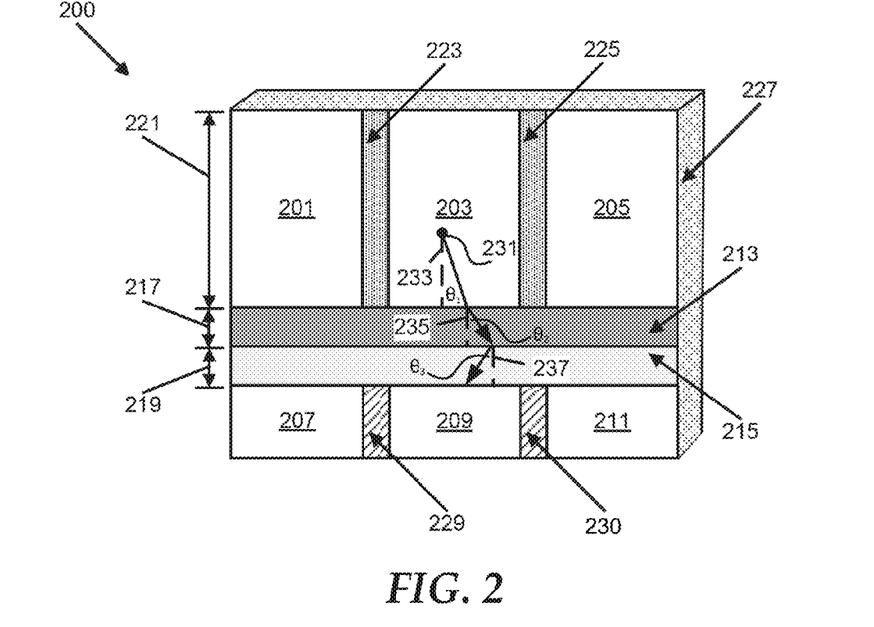
FIG. 2 is a diagram illustrating a radiation detection apparatus including an array of scintillation members and an array of photosensors in accordance with a particular embodiment.

FIG. 2 is a diagram illustrating a radiation detection apparatus 200 including an array of scintillation members and an array of photosensors in accordance with a particular embodiment. The array of scintillation members can include scintillation members 201, 203, and 205, and the array of photosensors can include photosensors 207, 209, and 211. Although the illustrative embodiment of FIG. 2 includes a number of scintillation members that is the same as the number of photosensors, other embodiments can include a number of scintillation members that is different from a number of photosensors. For example, a ratio of a number of scintillation members to a number of photosensors can be at least approximately 1.5:1, at least approximately 2:1, at least approximately 3:1, at least approximately 5:1, or at least approximately 10:1. In this way, photons exiting multiple scintillation members 201, 203, and 205 can be received by a single photosensor. In addition, in a particular embodiment, one or more of the scintillation members 201, 203, or 205 can be a component of the scintillation device 105 of FIG. 1.

In the illustrative embodiment of FIG. 2, each of the scintillation members 201, 203, and 205 is aligned with a corresponding photosensor. For example, the scintillation member 201 corresponds with the photosensor 207, the scintillation member 203 corresponds with the photosensor 209, and the scintillation member 205 corresponds with the photosensor 211. In a particular embodiment, the scintillation members 201, 203, and 205 lie along a substantially common plane. In the illustrative embodiment of FIG. 2, the substantially common plane is horizontal. In another embodiment, the substantially common plane can be vertical.

The scintillation members 201, 203, and 205 can be optically coupled to the photosensors 207, 209, and 211 by an optical coupling interface comprising a first layer 213 and a second layer 215 disposed between the scintillation members 201, 203, and 205 and the photosensors 207, 209, and 211. In an embodiment, the first layer 213 can be disposed substantially along all of a side of the scintillation members 201, 203, and 205, while the second layer 215 can be disposed substantially along all of a side of the photosensors 207, 209, and 211. In a particular embodiment, the first layer 213 contacts a surface of the scintillation members 201, 203, and 205, and the second layer 215 contacts a surface of the photosensors 207, 209, and 211. In an additional embodiment, substantially no voids are disposed between the scintillation members 201, 203, and 205 and the photosensors 207, 209, and 211. In the illustrative embodiment of FIG. 2, the first layer 213 is closer to the scintillation members 201, 203, and 205 as compared to the photosensors 207, 209, and 211, and the second layer 215 is closer to the photosensors 207, 209, and 211 as compared to the scintillation members 201, 203, and 205.

In the illustrative embodiment of FIG. 2, the first layer 213 has a thickness 217 and the second layer 215 has a thickness 219. In an embodiment, the thickness 217, the thickness 219, or both can be substantially uniform. In another embodiment, the thickness 217, the thickness 219, or both can be at least approximately 0.025 microns, at least approximately 0.5 microns, at least approximately 11 microns, at least approximately 42 microns, at least approximately 86 microns, or at least approximately 139 microns. In a further embodiment, the thickness 217, the thickness 219, or both may be no greater than approximately 25 mm, no greater than approximately 14 mm, no greater than approximately 6 mm, no greater than approximately 0.91 mm, no greater than approximately 0.64 mm, or no greater than approximately 0.27 mm. In an illustrative embodiment, the thickness 217 of the first layer 213 can be within a range of approximately 86 microns to approximately 270 microns. In another illustrative embodiment, the thickness 219 of the second layer 215 can be within a range of approximately 0.27 mm to approximately 0.91 mm. In an additional illustrative embodiment, the thickness 219 of the second layer 215 can be within a range of approximately 0.64 mm to approximately 6 mm.

In an embodiment, a pitch of one or more of the scintillation members 201, 203, and 205 may be no greater than approximately 11.3 mm, no greater than approximately 9.8 mm, no greater than approximately 8.1 mm, no greater than approximately 6.7 mm, or no greater than approximately 5.2 mm. In another embodiment, the pitch of one or more of the scintillation members 201, 203, and 205 can be at least approximately 0.3 mm, at least approximately 0.9, mm, at least approximately 2.2 mm, at least approximately 3.6 mm, or at least approximately 4.7 mm. In an illustrative embodiment, the pitch of the scintillation members 201, 203, and 205 can be within a range of approximately 0.3 mm to approximately 2.2 mm. In another illustrative embodiment, the pitch of the scintillation members 201, 203, and 205 can be within a range of approximately 3.6 mm to approximately 8.1 mm. The pitch of the scintillation members 201, 203, and 205 as used herein refers to a distance between adjacent scintillation members. In addition, a length 221 of one or more of the scintillation members 201, 203, and 205 can be within a range of approximately 0.8 mm to approximately 3.6 mm.

In an embodiment, one or more of the scintillation members 201, 203, and 205 can be adjacent to septa, such as septum 223 and septum 225. In a particular embodiment, the septum 223 and the septum 225 can include a reflective material, such as a metal foil, polytetrafluoroethylene (PTFE), $TiO_2$, or any combination thereof. In a further embodiment, one or more sides of the scintillation members 201, 203, and 205; one or more sides of the first layer 213; one or more sides of the second layer 215; one or more sides of the photosensors 207, 209, and 211; or any combination thereof, can be surrounded by reflective material 227. In an additional embodiment, one or more of the photosensors 207, 209, and 211 can be adjacent to septa, such as septum 229 and septum 230. In an embodiment, the septa 223 and 225 can include material that is different from the septa 229 and 230. For example, the septa 229 and 230 can include an epoxy, such as a white epoxy; aluminum (e.g. aluminum foil); lead (e.g. a lead foil); a polyester, such as a white polyester; a ceramic (e.g. Macor); alumina; a gas, such as air; or a combination thereof.

In one embodiment, the first layer 213 and the second layer 215 can have an index of refraction that is different from the index of refraction of the scintillation members 201, 203, and 205. In an embodiment, the index of refraction of the first layer 213, the index of refraction of the second layer 215, or both can be measured using light of a particular wavelength. In an illustrative embodiment, the index of refraction of the first layer 213, the index of refraction of the second layer 215, or both, can be measured using light having a peak wavelength within a range of approximately 585 nm to approximately 595 nm.

In a particular embodiment, the first layer 213 can have an index of refraction that has a value greater than 0. For example, the first layer 213 can have an index of refraction of at least approximately 0.01, at least approximately 0.27, at least approximately 0.52, at least approximately 0.83, or at least approximately 1.05. In another embodiment, the first layer 213 may have an index of refraction no greater than approximately 4.10, no greater than approximately 3.65, no greater than approximately 3.12, no greater than approximately 2.81, no greater than approximately 2.39, no greater than approximately 1.83, no greater than approximately 1.46, or no greater than approximately 1.22. In one illustrative embodiment, the refractive index of the layer 213 can be within a range of approximately 1.22 and approximately 1.83. In another illustrative embodiment, the refractive index of the layer 213 can be within a range of approximately 1.05 and approximately 1.46.

In an embodiment, the second layer 215 can have an index of refraction that has a value less than 0. For example, the second layer 215 can have an index of refraction of at least approximately −2.31, at least approximately −2.07, at least approximately −1.82, at least approximately −1.58, or at least approximately −1.36. In another embodiment, the second layer 215 can have an index of refraction of no greater than approximately −0.01, no greater than approximately −0.21, no greater than approximately −0.53, no greater than approximately −0.78, no greater than approximately −0.93, or no greater than approximately −1.16. In one illustrative embodiment, the second layer 215 can have an index of refraction within a range of approximately −0.21 and approximately −0.78. In another illustrative embodiment, the second layer 215 can have an index of refraction within a range of approximately −0.53 to approximately −0.93. In an additional illustrative embodiment, the second layer 215 can have an index of refraction within a range of approximately −0.93 to approximately −1.58.

In an embodiment, an absolute value of a product of the thickness 217 and the index of refraction of the first layer 213 is within 31% of an absolute value of a product of the thickness 219 and the index of refraction of the second layer 215, within 23% of an absolute value of a product of the thickness 217 and the index of refraction of the second layer 215, within 16% of the absolute value of the product of the thickness 217 and the index of refraction of the second layer 215, within 9% of the absolute value of the product of the thickness 217 and the index of refraction of the second layer 215, or within 2% of the absolute value of the product of the thickness 217 and the index of refraction of the second layer 215. In one particular embodiment, an absolute value of a product of the thickness 217 and the index of refraction of the first layer 213 is substantially equal to an absolute value of a product of the thickness 219 and the index of refraction of the second layer 215.

In an embodiment, the first layer 213, the second layer 215, or both, can include a gas, a liquid, a solid, or a combination thereof. In an additional embodiment, the first layer 213, the second layer 215, or both can include a non-Newtonian fluid, such as a gel. In a particular embodiment, the first layer 213 can include an organic polymer or another suitable optical coupling material. For example, the first layer 213 can include a silicone rubber, an epoxy, a plastic, or any combination thereof. In one embodiment, the second layer 215 can include a flexible material, while in another embodiment the second layer 215 can include a rigid material.

In an embodiment, the second layer 215 can include a plurality of sub-layers. In a particular embodiment, the plurality of sub-layers can be arranged in the form of a grid. In an embodiment, the sub-layers of the second layer 215 can have a thickness of at least approximately 6 nm, at least approximately 24 nm, at least approximately 48 nm, or at least approximately 71 nm. In an additional embodiment, the sub-layers of the second layer 215 can have a thickness of no greater than approximately 155 nm, no greater than approximately 137 nm, no greater than approximately 113 nm, no greater than approximately 101 nm, or no greater than approximately 86 nm. In an illustrative embodiment, sub-layers of the second layer 215 can have a thickness within a range of approximately 6 nm to approximately 48 nm. In another illustrative embodiment, sub-layers of the second layer 215 can have a thickness within a range of approximately 24 nm to approximately 86 nm.

In one embodiment, the second layer 215 can include a dielectric material. In an additional embodiment, the second layer 215 can include a metal, a metal alloy, or a combination thereof. For example, the second layer 215 can include aluminum, silver, gold, or a combination thereof.

In an embodiment, the second layer 215 can include a plurality of nanostructures. In a particular embodiment, the plurality of nanostructures can have a polygonal shape, a cylindrical shape, an ellipsoidal shape, a triangular shape, a rectangular shape, a spherical shape, a helical shape, or a combination thereof. In one embodiment, nanostructures of the second layer 215 can have a dimension with a value of at least approximately 5 nm, at least approximately 31 nm, at least approximately 56 nm, at least approximately 79 nm, at least approximately 103 nm, or a least approximately 128 nm. In another embodiment, nanostructures of the second layer 215 can have a dimension with a value of no greater than approximately 510 nm, no greater than approximately 455 nm, no greater than approximately 389 nm, no greater than approximately 314 nm, no greater than approximately 267 nm, no greater than approximately 192 nm, or no greater than approximately 167 nm. In an illustrative embodiment, nanostructures of the second layer 215 can have a dimension with a value within a range of approximately 5 nm to approximately 56 nm. In another illustrative embodiment, the nanostructures of the second layer 215 can have a dimension with a value within a range of approximately 31 nm to approximately 79 nm. In a further illustrative embodiment, the nanostructures of the second layer 215 can have a dimension with a value within a range of approximately 56 nm to approximately 103 nm. In a particular embodiment, the dimension of the nanostructures of the second layer 215 can include a diameter, a length, a width, a height, a pitch, or a combination thereof.

In an embodiment, the materials of the layer 215 and the shapes of nanostructures of the layer 215 can be configured such that the layer 215 has an index of refraction with a value less than 0 within a particular spectrum of wavelengths. In one embodiment, the scintillation members 201, 203, 205 can emit scintillating light having a spectrum of wavelengths that includes at least a portion of the spectrum of wavelengths for which the second layer 215 has an index of refraction with a value less than 0. In a particular embodiment, at least approximately 35% of the wavelengths for which the second layer 215 has an index of refraction with a value less than 0 are included in the wavelengths of the scintillating light emitted by the scintillation members 201, 203, 205; at least approximately 52% of the wavelengths for which the second layer 215 has an index of refraction with a value less than 0 are included in the wavelengths of the scintillating light emitted by the scintillation members 201, 203, 205; at least approximately 77% of the wavelengths for which the second layer 215 has an index of refraction with a value less than 0 are included in the wavelengths of the scintillating light emitted by the scintillation members 201, 203, 205; or at least approximately 98% of the wavelengths for which the second layer 215 has an index of refraction with a value less than 0 are included in the wavelengths of the scintillating light emitted by the scintillation members 201, 203, 205. In another embodiment, substantially all of the wavelengths for which the second layer 215 have an index of refraction with a value less than 0 are included in the wavelengths of the scintillating light emitted by the scintillation members 201, 203, 205.

Although the illustrative embodiment of FIG. 2 includes a first layer 213 and a second layer 215, the radiation detection apparatus 200 can include one or more additional layers coupled between the scintillation members 201, 203, 205 and the photosensors 207, 209, 211. For example, the radiation detection apparatus 200 can include one or more additional layers having an index of refraction with a value greater than 0, one or more additional layers having an index of refraction with a value less than 0, or both. In another example, the radiation detection apparatus 200 can include one or more adhesive layers coupled between the scintillation members 201, 203, 205 and the photosensors 207, 209, 211, one or more windows, such as the window 111 of FIG. 1, coupled between the scintillation members 201, 203, 205 and the photosensors 207, 209, 211, or a combination thereof.

In an illustrative embodiment, a photon 231 can be produced in response to the scintillation member 203 capturing radiation. The photon 231 can travel through the scintillation member 203 at a first angle $\theta_1$ relative to a first vertical plane 233. When the photon 231 reaches the first layer 213, the photon 231 can travel through the first layer 213 at a second angle $\theta_2$ relative to a second vertical plane 235 due to the index of refraction of the first layer 213 being different from the index of refraction of the scintillation member 203. In an embodiment, the second angle $\theta_2$ can have a value greater than that of the first angle $\theta_1$. In addition, when the photon 231 reaches the second layer 215, the photon 231 can travel through the second layer 215 at a third angle $\theta_3$ relative to a third vertical plane 237. In one embodiment, an absolute value of the third angle $\theta_3$ can be substantially equal to an absolute value of the second angle $\theta_2$. To illustrate, the absolute value of the third angle $\theta_3$ can be substantially equal to an absolute value of the second angle $\theta_2$ when the absolute value of the product of the thickness 217 and the index of refraction of the first layer 213 is substantially equal to the absolute value of the product of the thickness 219 and the index of refraction of the second layer 215.

In this way, the path of photons travelling between the scintillation members 201, 203, and 205 and the photosensors 207, 209, and 211 can be controlled such that photons produced by a particular scintillation member 201, 203, and 205 are sensed by a particular photosensor 207, 209, and 211. For example, in the illustrative embodiment of FIG. 2, the correspondence between the second angle $\theta_2$ of the first layer 213 and the third angle $\theta_3$ of the second layer 215, directs the photon 231 to be sensed by the photosensor 209. In another embodiment, the correspondence between the second angle $\theta_2$ of the first layer 213 and the third angle $\theta_3$ of the second layer 215, can direct the photon 231 to be sensed by another photosensor, such as the photosensor 207 or the photosensor 211. By controlling the path of photons between the scintillation members 201, 203, and 205 and the photosensors 207, 209, and 211, images produced by the radiation detection apparatus 200 can also be improved. In one example, clearer images can be produced when photons produced by one of the scintillation members 201, 203, and 205 are sensed by a corresponding photosensor 207, 209, or 211. To illustrate, clearer images can be produced when photons exiting the scintillation member 201 are sensed by the photosensor 207, photons exiting the scintillation member 203 are sensed by the photosensor 209, and photons exiting the scintillation member 205 are sensed by the photosensor 211.

In one particular illustrative embodiment, a photon detection efficiency of the radiation detection apparatus 200 can be at least approximately 91%, at least approximately 96%, or at least approximately 99%. As used herein, the term "photon detection efficiency" refers to a number of photons that are sensed by a particular photosensor 207, 209, or 211 relative to a number of photons emitted by the corresponding scintillation member 201, 203, or 205 that are sensed by any one of the photosensors 207, 209, 211. For example, the scintillation member 201 may emit 5000 photons in a particular time period, 3800 of the 5000 photons emitted by the scintillation member 201 may be sensed by one of the photosensors 207, 209, and 211, and 3700 of the photons sensed by the photosensors 207, 209, and 211 may be sensed by the photosensor 207, where the photosensor 207 corresponds to the scintillation member 201. In this example, the photon detection efficiency can be approximately 97% (i.e. 3700/3800×(100)). In certain embodiments, the number of photons emitted by the scintillation members 201, 203, 205 can be less than the number of photons sensed by any one of the photosensors 207, 209, 211 due to absorption of the photons by the first layer 213, the second layer 215, or both, of the optical coupling interface of the radiation detection apparatus 200. In one embodiment, the second layer 215 can absorb a number of photons that is greater than a number of photons absorbed by the first layer 213.

Additionally, the use of a layer having an index of refraction that is greater than 0 in conjunction with a layer having an index of refraction that is less than 0 can provide flexibility in the thickness of the optical coupling materials in order to reduce or eliminate voids between the scintillation members 201, 203, 205; the photosensors 207, 209, 211; and an optical interface coupling the scintillation members 201, 203, 205 and the photosensors 207, 209, 211. Furthermore, pixilation of the optical coupling interface between the scintillation members 201, 203, 205 and the photosensors 207, 209, 211 is unnecessary, which can reduce the cost and complexity of manufacturing the radiation detection apparatus 200.

Figure 3:
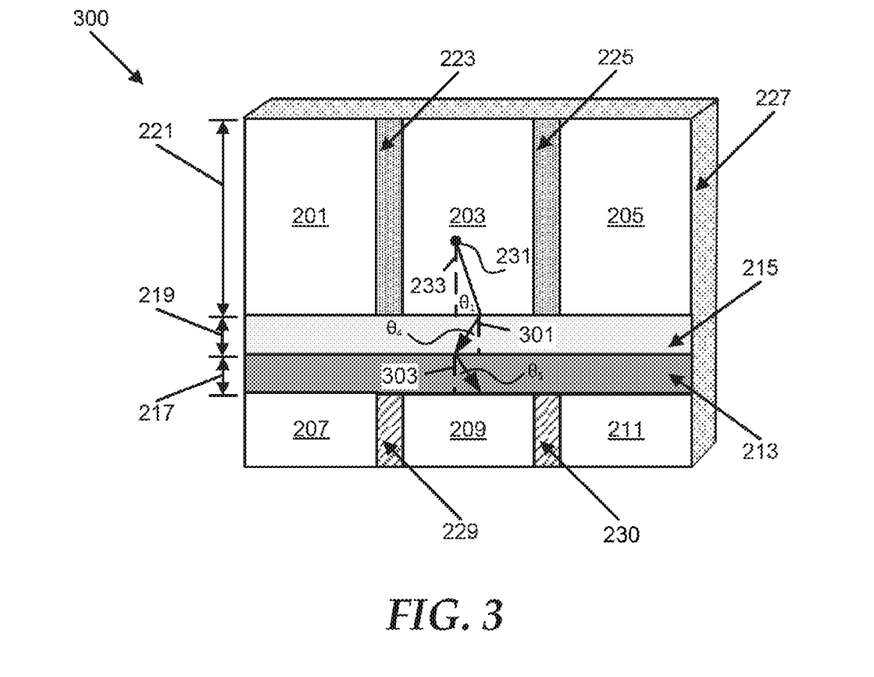
FIG. 3 is a diagram illustrating a radiation detection apparatus including an array of scintillation members and an array of photosensors in accordance with another particular embodiment.

FIG. 3 is a diagram illustrating a radiation detection apparatus 300 including an array of scintillation members and an array of photosensors in accordance with another particular embodiment. The components of the radiation detection apparatus 300 are substantially the same as the components of the radiation detection apparatus 200 of FIG. 2. However, in the illustrative embodiment of FIG. 3, the first layer 213 is closer to the photosensors 207, 209, and 211 as compared to the scintillation members 201, 203, and 205, and the second layer 215 is closer to the scintillation members 201, 203, and 205 as compared to the photosensors 207, 209, and 211.

Accordingly, in an illustrative embodiment, a photon 231 can be produced in response to the scintillation member 203 being exposed to radiation. The photon 231 can travel through the scintillation member 203 at a first angle $\theta_1$ relative to a first vertical plane 233. When the photon 231 reaches the second layer 215, the photon 231 can travel through the second layer 215 at a fourth angle $\theta_4$ relative to a fourth vertical plane 301 due to the index of refraction of the second layer 215 being different from the index of refraction of the scintillation member 203. In addition, when the photon 231 reaches the first layer 213, the photon 231 can travel through the first layer 215 at a fifth angle $\theta_5$ relative to a fifth vertical plane 303. In one embodiment, an absolute value of the fourth angle $\theta_4$ can be substantially equal to an absolute value of the fifth angle $\theta_2$ when the absolute value of the product of the thickness 217 and the index of refraction of the first layer 213 is substantially equal to the absolute value of the product of the thickness 219 and the index of refraction of the second layer 215. In an embodiment, an absolute value of the fourth angle $\theta_4$ can be different from the absolute value of the third angle $\theta_3$ of FIG. 2. In another embodiment, an absolute value of the fifth angle $\theta_5$ can be different from an absolute value of the second angle $\theta_2$ of FIG. 2.

Figure 4:
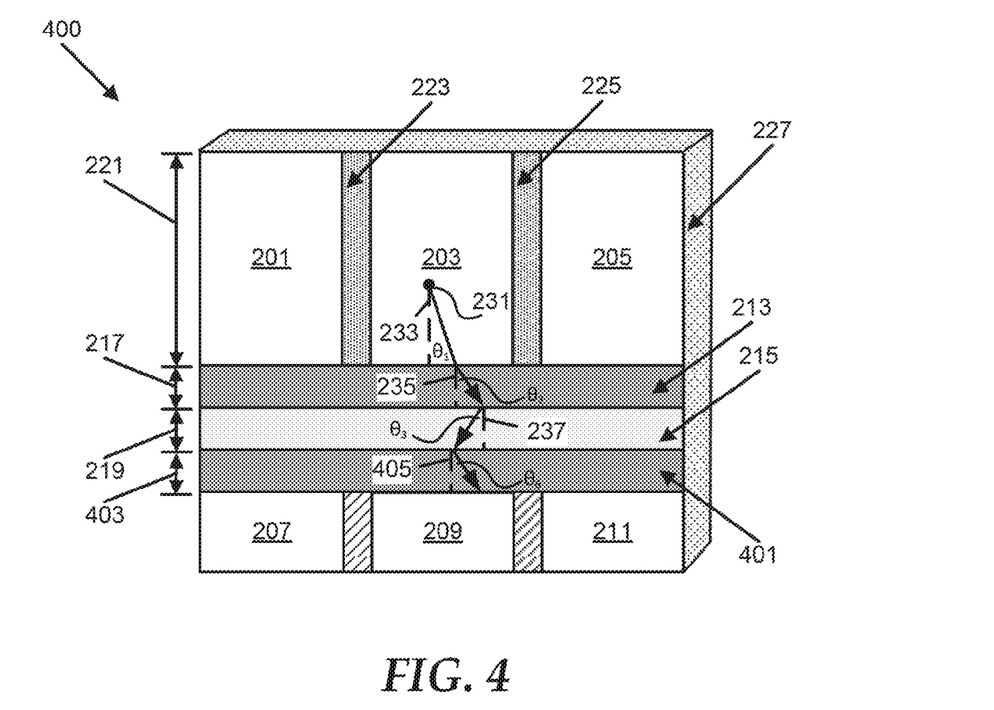
FIG. 4 is a diagram illustrating a radiation detection apparatus including an array of scintillation members and an array of photosensors in accordance with an additional embodiment.

FIG. 4 is a diagram illustrating a radiation detection apparatus 400 including an array of scintillation members and an array of photosensors in accordance with an additional embodiment. The radiation detection apparatus 400 includes a number of components that are included in the radiation detection apparatus 200 of FIG. 2. The radiation detection apparatus 400 also includes a number of additional components. For example, the radiation detection apparatus 400 includes a third layer 401, such that the second layer 215 is coupled between the first layer 213 and the third layer 401. In one embodiment, the third layer 401 can include one or more materials of the first layer 213.

The third layer 401 can have a thickness 403 and a respective index of refraction. In an embodiment, the index of refraction of the third layer 401 can have a value that is greater than 0. In a particular embodiment, the index of refraction of the third layer 401 can have a value that is substantially equal to the value of the index of refraction of the first layer 213. In an additional embodiment, the thickness 403 can be substantially uniform and can be substantially equal to the thickness 217.

In an illustrative embodiment, a photon 231 can be produced in response to the scintillation member 203 being exposed to radiation. The photon 231 can travel through the scintillation member 203 at a first angle $\theta_1$ relative to a first vertical plane 233. When the photon 231 reaches the first layer 213, the photon 231 can travel through the first layer 213 at a second angle $\theta_2$ relative to a second vertical plane 235 due to the index of refraction of the first layer 213 being different from the index of refraction of the scintillation member 203. In addition, when the photon 231 reaches the second layer 215, the photon 231 can travel through the second layer 215 at a third angle $\theta_3$ relative to a third vertical plane 237. Further, when the photon 231 reaches the third layer 401, the photon can travel through the third layer 401 at a sixth angle $\theta_6$ relative to a sixth vertical plane 405. In one embodiment, an absolute value of the third angle $\theta_3$ can be substantially equal to an absolute value of the second angle $\theta_2$ when the absolute value of the product of the thickness 217 and the index of refraction of the first layer 213 is substantially equal to the absolute value of the product of the thickness 219 and the index of refraction of the second layer 215. In an additional embodiment, an absolute value of the sixth angle $\theta_6$ can be substantially equal to an absolute value of the second angle $\theta_2$, the third angle $\theta_3$, or both. For example, an absolute value of the sixth angle $\theta_6$ can be substantially equal to an absolute value of the second angle $\theta_2$ when the absolute value of the product of the thickness 217 and the index of refraction of the first layer 213 is substantially equal to the absolute value of the product of the thickness 403 and the index of refraction of the fourth layer 401. In another example, an absolute value of the sixth angle $\theta_6$ can be substantially equal to an absolute value of the third angle $\theta_2$ when the absolute value of the product of the thickness 219 and the index of refraction of the second layer 215 is substantially equal to the absolute value of the product of the thickness 403 and the index of refraction of the fourth layer 401.

Although the illustrative embodiments of FIGS. 1-4 include a radiation detection apparatus that includes scintillation members and photosensors, the features described herein can also be included in an apparatus that includes a light emitting device, such as a semiconductor-based light emitting diode, and a light sensing device. In an embodiment, the light sensing device can be optically coupled to the light emitting device via a first layer, such as the first layer 107 or 213, having an index of refraction with a value greater than 0 and a second layer, such as the second layer 109 and 215, having an index of refraction with a value less than 0. In a particular embodiment, an absolute value of a product of a thickness of the first layer and the index of refraction of the first layer is within at least approximately 35% of an absolute value of a product of the thickness of the second layer and the index of refraction of the second layer. In a non-limiting illustrative embodiment, the light emitting device can include scintillator and the light sensing device can include a photosensor.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa. Embodiments may be in accordance with any one or more of the items as listed below.

Item 1. An apparatus comprising a light emitting device; a first layer having a first thickness and a first index of refraction with a value greater than 0; a second layer having a second thickness and a second index of refraction with a value less than 0; and a light sensing device optically coupled to the light emitting device via the first layer and the second layer, wherein an absolute value of a first product of the first thickness and the first index of refraction is within at least approximately 35% of an absolute value of a second product of the second thickness and the second index of refraction.

Item 2. The apparatus of item 1, wherein the light emitting device is a scintillator and the light sensing device is a photosensor.

Item 3. A radiation detection apparatus comprising a scintillator; a photosensor; a first layer coupled between the scintillator and the photosensor, the first layer having a first thickness and a first index of refraction with a value that is greater than 0; and a second layer coupled between the scintillator and the photosensor, the second layer having a second thickness and a second index of refraction with a value that is less than 0.

Item 4. The radiation detection apparatus of item 3, wherein an absolute value of a product of the first thickness and the first index of refraction is within 31% of an absolute value of a product of the second thickness and the second index of refraction, within 23% of an absolute value of a product of the second thickness and the second index of refraction, within 16% of an absolute value of the product of the second thickness and the second index of refraction, within 9% of an absolute value of the product of the second thickness and the second index of refraction, or within 2% of an absolute value of the product of the second thickness and the second index of refraction.

Item 5. The apparatus or the radiation detection apparatus of any one of items 2 to 4, wherein the first layer is closer to the scintillator as compared to the photosensor and the second layer is closer to the photosensor as compared to the scintillator.

Item 6. The apparatus or the radiation detection apparatus of any one of items 2 to 4, wherein the first layer is closer to the photosensor as compared to the second layer and the second layer is closer to the scintillator as compared to the first layer.

Item 7. The apparatus or the radiation detection apparatus of any one of items 2 to 4, further comprising a third layer having a third thickness and a third index of refraction with a value that is greater than 0.

Item 8. The apparatus or the radiation detection apparatus of item 7, wherein the value of the third index of refraction is substantially equal to the value of the first index of refraction.

Item 9. The apparatus or the radiation detection apparatus of item 7 or 8, wherein the first layer is proximate to the scintillator, the third layer is proximate to the photosensor, and the second layer is coupled between the first layer and the third layer.

Item 10. The apparatus or the radiation detection apparatus of any one of the preceding items, wherein the first thickness, the second thickness, or both is at least approximately 0.025 microns, at least approximately 0.5 microns, at least approximately 11 microns, at least approximately 42 microns, at least approximately 86 microns, or at least approximately 139 microns; or wherein the first thickness, the second thickness, or both is no greater than approximately 25 mm, no greater than approximately 14 mm, no greater than approximately 6 mm, no greater than approximately 0.91 mm, no greater than approximately 0.64 mm, or no greater than approximately 0.27 mm.

Item 11. The apparatus or the radiation detection apparatus of item 10, wherein the first thickness is within a range of approximately 86 microns to approximately 270 microns.

Item 12. The apparatus or the radiation detection apparatus of item 10 or 11, wherein the second thickness is within a range of approximately 0.27 mm to approximately 0.91 mm or the second thickness is within a range of approximately 0.64 mm to approximately 6 mm.

Item 13. The apparatus or the radiation detection apparatus of any one of items 2 to 12, further comprising an array of scintillator pixels and an array of photosensors, wherein the scintillator is one scintillator pixel of the array of scintillator pixels and the photosensor is one photosensor of the array of photo sensors.

Item 14. The apparatus or the radiation detection apparatus of item 13, wherein a number of scintillator pixels of the array of scintillator pixels is the same as a number of photosensors of the array of photo sensors.

Item 15. The apparatus or the radiation detection apparatus of item 13, wherein a number of the scintillator pixels of the array of scintillator pixels is different from a number of photosensors of the array of photosensors.

Item 16. The apparatus or the radiation detection apparatus of any one of the preceding items, wherein the first layer includes an organic polymer.

Item 17. The apparatus or the radiation detection apparatus of any one of the preceding items, wherein the second layer includes a plurality of sub-layers.

Item 18. The apparatus or the radiation detection apparatus of item 17, wherein the plurality of sub-layers are arranged in the form of a grid.

Item 19. The apparatus or the radiation detection apparatus of any one of the preceding items, wherein the second layer includes a dielectric material.

Item 20. The apparatus or the radiation detection apparatus of any one of the preceding items, wherein the second layer includes a metal, a metal alloy, or a combination thereof.

Item 21. The apparatus or the radiation detection apparatus of item 20, wherein the metal, the metal alloy, or both, include aluminum, silver, gold, or a combination thereof.

Item 22. The apparatus or the radiation detection apparatus of any one of the preceding items, wherein the second layer includes a plurality of nanostructures.

Item 23. The apparatus or the radiation detection apparatus of item 22, wherein the plurality of nanostructures have a polygonal shape, a cylindrical shape, an ellipsoidal shape, a triangular shape, a rectangular shape, a spherical shape, a helical shape, or a combination thereof.

Item 24. The apparatus or the radiation detection apparatus of any one of items 2 to 23, wherein the scintillator emits scintillating light having a first spectrum of wavelengths, wherein the second index of refraction is less than 0 for light having wavelengths within a second spectrum of wavelengths, and wherein at least a portion of the wavelengths of the second spectrum are included in the wavelengths of the first spectrum.

Item 25. The apparatus or the radiation detection apparatus of item 24, wherein at least approximately 35% of the wavelengths of the second spectrum are included in the wavelengths of the first spectrum, at least approximately 52% of the wavelengths of the second spectrum are included in the wavelengths of the first spectrum, at least approximately 77% of the wavelengths of the second spectrum are included in the wavelengths of the first spectrum, or at least approximately 98% of the wavelengths of the second spectrum are included in the wavelengths of the first spectrum.

Item 26. The apparatus or the radiation detection apparatus of item 24, wherein substantially all of the wavelengths of the second spectrum are included in the first spectrum.

Item 27. The apparatus or the radiation detection apparatus of any one of items 2 to 23, wherein the scintillator emits scintillating light having a spectrum of wavelengths, at least a portion of the wavelengths of the spectrum of wavelengths being at least approximately 375 nm, at least approximately 402 nm, at least approximately 467 nm, or at least approximately 504 nm; or at least a portion of the wavelengths of the spectrum of wavelengths being no greater than approximately 755 nm, no greater than approximately 698 nm, no greater than approximately 627 nm, or no greater than approximately 551 nm.

Item 28. The apparatus or the radiation detection apparatus of item 27, wherein the scintillating light has an emission maximum within a range of approximately 504 nm to approximately 627 nm.

Item 29. The apparatus or the radiation detection apparatus of any one of items 2 to 28, wherein a photon detection efficiency of the apparatus or the radiation detection apparatus is at least approximately 91%, at least approximately 96%, or at least approximately 99%.

EXAMPLES

The concepts described herein will be further described in the following examples, which do not limit the scope of the features described in the claims. Numerical values in this Examples section may be approximated or rounded off for convenience.

In a first example, a simulation is performed using a DETECT2000 simulator described in "An Improved Monte-Carlo Simulator for the Computer Aided Design of Photon Sensing Devices," by Cayouette, F., Laurendau D., and Moisan, C. (2001). The simulation is performed with an optical interface coupled between a 3×3 array of CsI(Tl) scintillators and a corresponding 3×3 array of silicon diode photosensors. The parameters of the simulation include the optical interface having a single layer of silicone rubber with a thickness of approximately 0.1 mm and an index of refraction of approximately 1.412 and a PTFE reflector having a reflectivity of approximately 97%. The simulation is conducted by recording the locations of photons sensed by the photosensors, where 10,000 photons are generated by a middle scintillator of the scintillator array.

Figure 5:
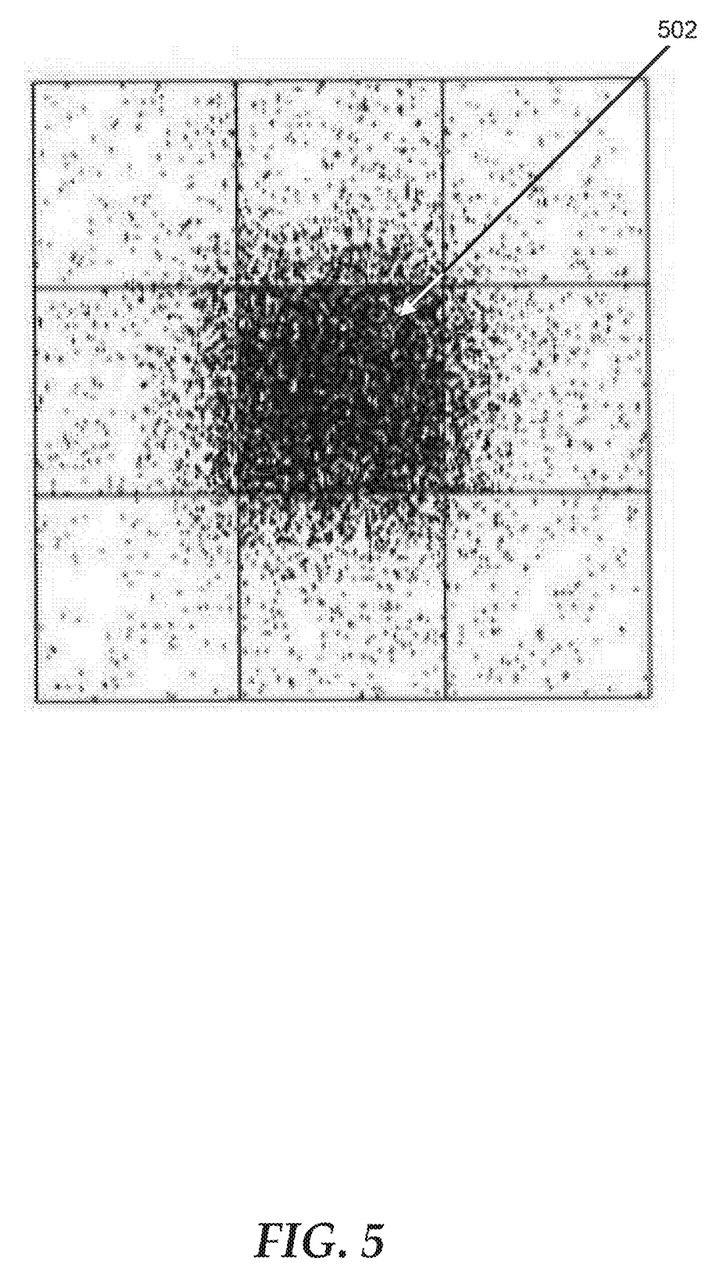
FIG. 5 is an image illustrating the locations of photons sensed by an array of photosensors during a first simulation, where the photons are produced by a particular scintillator associated with a respective photosensor of the array.

FIG. 5 is an image illustrating the locations of photons sensed by the array of photosensors, where the photons are produced by a scintillator corresponding to photosensor 502. Approximately 36% of the photons generated by the middle scintillator are not sensed by the corresponding photosensor 502. The number of photons sensed by photosensors other than photosensor 502 is an indication of the amount of cross-talk for the simulation.

In a second example, another simulation is performed using the same software as the simulation of the first example, where an optical interface is coupled between a 3×3 array of CsI(Tl) scintillators and a corresponding 3×3 array of silicon diode photosensors. The simulation is also performed with a PTFE reflector having a reflectivity of approximately 97%. The parameters of the simulation include the optical interface including two layers, with each layer having a thickness of approximately 0.1 mm A first layer of silicone rubber has an index of refraction of approximately 1.412 and a second layer has an index of refraction of approximately −1.412. The simulation is conducted by recording the locations of photons sensed by the photosensors, where 10,000 photons are generated by a middle scintillator of the array.

Figure 6:
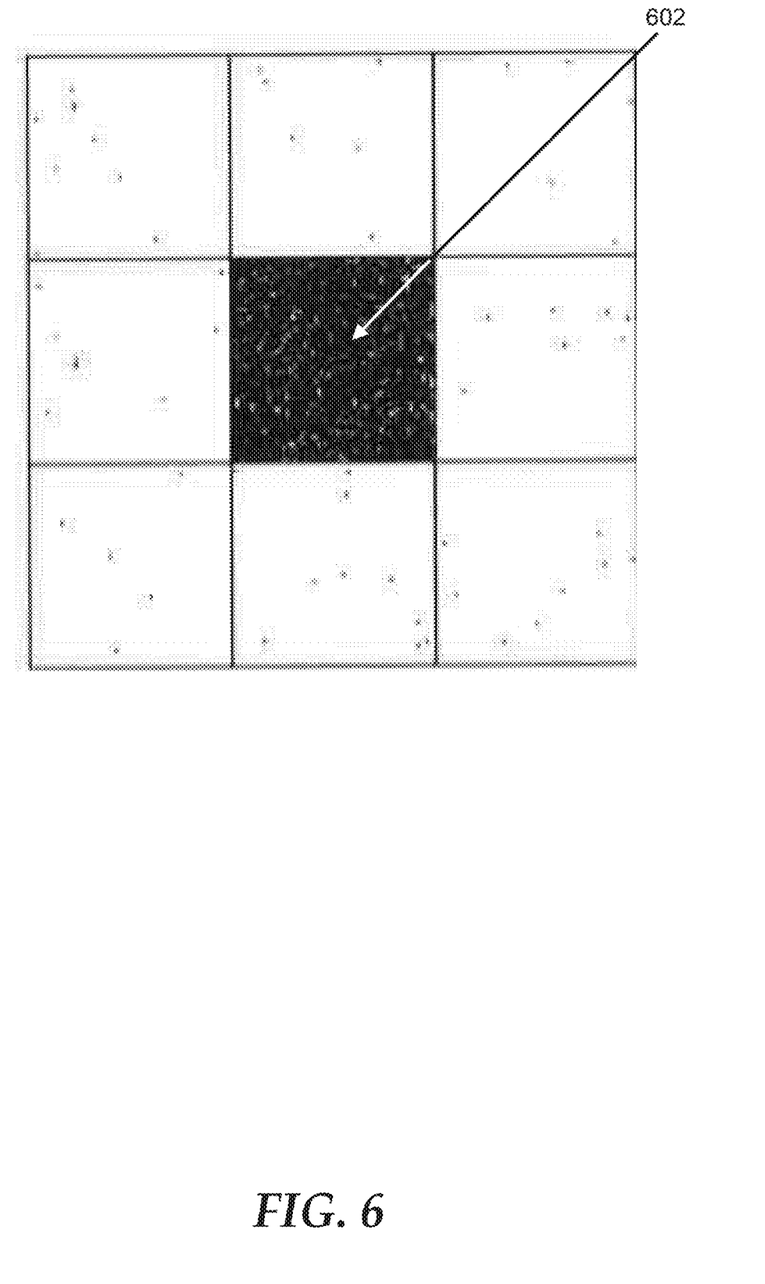
FIG. 6 is an image illustrating the locations of photons sensed by an array of photosensors during a second simulation, where the photons are produced by a particular scintillator associated with a respective photosensor of the array.

FIG. 6 is an image illustrating the locations of photons sensed by the array of photosensors, where the photons are produced by a scintillator corresponding to photosensor 602. Approximately 0.6% of the photons generated by the middle scintillator are not sensed by the corresponding photosensor 602. Accordingly, cross-talk is reduced by approximately 98% in the simulation of the second example as compared to the simulation of the first example.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. An apparatus comprising:
   a light emitting device comprising a first scintillator pixel and a second scintillator pixel, each of the first and second scintillator pixels having a light emitting end;
   a first layer having a first thickness and a first index of refraction with a value greater than 0, the first layer extending continuously over and coupled to the light emitting ends of the first and second scintillator pixels;
   a second layer having a second thickness and a second index of refraction with a value less than 0; and
   a light sensing device optically coupled to the light emitting device via the first layer and the second layer, wherein an absolute value of a first product of the first thickness and the first index of refraction is within at least approximately 35% of an absolute value of a second product of the second thickness and the second index of refraction.

2. The apparatus of claim 1, wherein the light sensing device comprises a first photosensor corresponding to the first scintillator pixel and the second photosensor corresponding to the second scintillator pixel.

3. A radiation detection apparatus comprising:
   a first scintillator pixel having a first light emitting end and a second scintillator pixel having a second light emitting end;
   a first photosensor coupled to the first light emitting end and a second photosensor coupled to the second light emitting end;
   a first layer coupled between the scintillator pixels and the photosensors, the first layer having a first thickness and a first index of refraction with a value that is greater than 0; and
   a second layer coupled between the scintillator pixels and the photosensors, the second layer having a second thickness and a second index of refraction with a value that is less than 0,
   wherein one of the first and second layers is closer to the scintillator pixels as compared to the photosensors and extends continuously over the first and second light emitting ends.

4. The radiation detection apparatus of claim 3, wherein an absolute value of a product of the first thickness and the first index of refraction is within 31% of an absolute value of a product of the second thickness and the second index of refraction.

5. The radiation detection apparatus of claim 3, wherein the first layer is closer to the scintillator as compared to the photosensor and the second layer is closer to the photosensor as compared to the scintillator.

6. The radiation detection apparatus of claim 3, wherein the first layer is closer to the photosensor as compared to the second layer and the second layer is closer to the scintillator as compared to the first layer.

7. The radiation detection apparatus of claim 3, further comprising a third layer having a third thickness and a third index of refraction with a value that is greater than 0.

8. The radiation detection apparatus of claim 7, wherein the value of the third index of refraction is substantially equal to the value of the first index of refraction.

9. The radiation detection apparatus of claim 3, wherein the first thickness, the second thickness, or both is at least approximately 0.025 microns, at least approximately 0.5 microns and no greater than approximately 25 mm.

10. The radiation detection apparatus of claim 3, further comprising an array of scintillator pixels and an array of photosensors, wherein first and second scintillator pixels are scintillator pixels of the array of scintillator pixels and the first and second photosensors are photosensors of the array of photosensors.

11. The radiation detection apparatus of claim 10, wherein a number of scintillator pixels of the array of scintillator pixels is the same as a number of photosensors of the array of photosensors.

12. The radiation detection apparatus of claim 10, wherein a number of the scintillator pixels of the array of scintillator pixels is different from a number of photosensors of the array of photosensors.

13. The radiation detection apparatus of claim 3, wherein the first layer includes an organic polymer.

14. The radiation detection apparatus of claim 3, wherein the second layer includes a plurality of sub-layers.

15. The radiation detection apparatus of claim 14, wherein the plurality of sub-layers are arranged in the form of a grid.

16. The radiation detection apparatus of claim 3, wherein the second layer includes a dielectric material.

17. The radiation detection apparatus of claim 3, wherein the second layer includes a metal, a metal alloy, or a combination thereof.

18. The radiation detection apparatus of claim 3, wherein the second layer includes a plurality of nanostructures.

19. The radiation detection apparatus of claim 3, wherein the scintillator emits scintillating light having a first spectrum of wavelengths, wherein the second index of refraction is less than 0 for light having wavelengths within a second spectrum of wavelengths, and wherein at least a portion of the wavelengths of the second spectrum are included in the wavelengths of the first spectrum.

20. The radiation detection apparatus of claim 19, wherein substantially all of the wavelengths of the second spectrum are included in the first spectrum.

* * * * *